(12) United States Patent
Su et al.

(10) Patent No.: US 12,517,784 B2
(45) Date of Patent: Jan. 6, 2026

(54) AUTOMOTIVE TOUCH CIRCUIT DEVICE WITH ESD PROTECTION

(71) Applicant: FocalTech Systems Co., Ltd., Hsinchu County (TW)

(72) Inventors: Fang-Yi Su, Hsinchu County (TW); Kai-Xiang Yang, Hsinchu County (TW)

(73) Assignee: FocalTech Systems Co., Ltd., Hsinchu County (TW)

( * ) Notice: Subject to any disclaimer, the term of this patent is extended or adjusted under 35 U.S.C. 154(b) by 0 days.

(21) Appl. No.: 18/776,478

(22) Filed: Jul. 18, 2024

(65) Prior Publication Data
US 2025/0130673 A1    Apr. 24, 2025

(30) Foreign Application Priority Data

Oct. 20, 2023 (TW) .................................. 112140203

(51) Int. Cl.
| | | |
|---|---|---|
| *G06F 11/10* | (2006.01) | |
| *G06F 3/044* | (2006.01) | |
| *H05K 9/00* | (2006.01) | |

(52) U.S. Cl.
CPC .......... *G06F 11/1004* (2013.01); *G06F 3/044* (2013.01); *H05K 9/0067* (2013.01); *G06F 2203/04107* (2013.01)

(58) Field of Classification Search
CPC ................. G06F 11/1004; G06F 3/044; G06F 2203/04107; G06F 3/0418; H05K 9/0067
See application file for complete search history.

(56) References Cited

U.S. PATENT DOCUMENTS 6,563,319 B1 * 5/2003 Kraz .................. G01R 31/1272
324/458
9,548,773 B1 * 1/2017 Cadigan ............... H04B 1/0475
(Continued)

FOREIGN PATENT DOCUMENTS

| CN | 109426384 A | 3/2019 |
|---|---|---|
| KR | 20180116122 A | 10/2018 |

OTHER PUBLICATIONS

M.-D. Ker, P.-Y. Chiu, W.-T. Shieh and C.-C. Wang, "ESD Protection Design for Touch Panel Control IC Against Latchup-Like Failure Induced by System-Level ESD Test," in IEEE Transactions on Electron Devices, vol. 64, No. 2, pp. 642-645, Feb. 2017 (Year: 2017).*

*Primary Examiner* — Cynthia Britt
(74) *Attorney, Agent, or Firm* — MUNCY, GEISSLER, OLDS & LOWE, P.C.

(57) ABSTRACT

An automotive touch circuit device includes: an analog front-end circuit, a first storage, a second storage, a micro control unit and an ESD protector. The analog front-end circuit has an ESD detector for detection to output a detection result signal. The first storage stores a control parameter having a first error detection code based on which a first error detection signal is generated. The second storage stores touch data having a second error detection code based on which a second error detection signal is generated. The micro control unit generates a notification signal based on the control parameter and touch data. When detecting no ESD interference, the ESD protector enables the notification signal to be output. When detecting ESD interference and an error detection result represented by one of the first and second error detection signals indicates an error, the ESD protector disables the notification signal to be output.

11 Claims, 3 Drawing Sheets

(56) References Cited

U.S. PATENT DOCUMENTS

| | | | |
|---|---|---|---|
| 2013/0016447 A1* | 1/2013 | Kitabata | H05K 9/0067 361/56 |
| 2014/0071092 A1 | 3/2014 | Shih et al. | |
| 2014/0176496 A1* | 6/2014 | Azumi | G06F 3/0445 345/174 |
| 2016/0149401 A1* | 5/2016 | Chen | H02H 9/04 361/56 |
| 2017/0131838 A1* | 5/2017 | Lu | G06F 3/0418 |
| 2018/0188868 A1* | 7/2018 | Park | G09G 3/20 |
| 2022/0028319 A1* | 1/2022 | Kim | G09G 3/3233 |
| 2024/0143112 A1* | 5/2024 | Ou | G06F 3/0416 |

* cited by examiner

| INT | CS1 | CS2 | ESDD | INTP |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 0 |
| 1 | 0 | 0 | 0 | 1 |
| 1 | 0 | 0 | 1 | 0 |
| 1 | 0 | 1 | 0 | 0 |
| 1 | 0 | 1 | 1 | 0 |
| 1 | 1 | 0 | 0 | 0 |
| 1 | 1 | 0 | 1 | 0 |
| 1 | 1 | 1 | 0 | 0 |
| 1 | 1 | 1 | 1 | 0 |

… # AUTOMOTIVE TOUCH CIRCUIT DEVICE WITH ESD PROTECTION

CROSS-REFERENCE TO RELATED APPLICATIONS

This application claims the benefits of the Taiwan Patent Application Serial Number 112140203, filed on Oct. 20, 2023, the subject matter of which is incorporated herein by reference.

BACKGROUND

Field of the Disclosure

The present disclosure relates to the technical field of touch circuit devices and, more particular, to an automotive touch circuit device with electrostatic discharge (ESD) protection.

Description of Related Art

With the advancement of touch technology, the application demand and market share of automotive touch panels are also increasing year by year, and automotive touch products typically require high functional safety, especially for the automobile central control screen formed by touch panels because that can control the automobile gear position, lights, handbrake and other settings related to driving safety. If electrostatic discharge (ESD) interferes with the touch panel and causes an accidental touch event, it may seriously threaten the driving safety of automobiles traveling on the road, thereby failing to meet the actual needs.

Therefore, in the application of the prior automotive touch panels, there are still many deficiencies that need to be alleviated and/or obviated.

SUMMARY

An object of the present disclosure is to provide an automotive touch circuit device with electrostatic discharge protection, which can realize electrostatic discharge protection of the automotive touch panel at low cost and high reliability, and prevent accidental touch events caused by electrostatic discharge interference, thereby achieving touch products with high safety.

To achieve the object, there is provided an automotive touch circuit device, which includes: an analog front-end (AFE) circuit for receiving touch input generated by an automotive touch panel and outputting touch data according to the touch input, wherein the analog front-end circuit has an electrostatic discharge detector for detecting the automotive touch circuit device and outputting a detection result signal that represents whether there is electrostatic discharge interference; a first storage for storing a control parameter to control the automotive touch circuit device to operate, the control parameter having a first error detection code, wherein a first error detection signal is generated correspondingly according to the first error detection code, and the first error detection signal represents whether an error detection result based on the first error detection code indicates an error; a second storage coupled to the analog front-end circuit and configured to receive and store the touch data having a second error detection code, wherein a second error detection signal is generated correspondingly according to the second error detection code, and the second error detection signal represents whether an error detection result based on the second error detection code indicates an error; a micro control unit coupled to the first storage and the second storage for generating a notification signal based on the control parameter and the touch data; and an electrostatic discharge protector coupled to the electrostatic discharge detector, the first storage, the second storage and the micro control unit for respectively receiving the detection result signal, the first error detection signal, the second error detection signal and the notification signal, wherein, when the detection result signal indicates that there is no electrostatic discharge interference, the electrostatic discharge protector enables the notification signal to be output and, when the detection result signal indicates that there is electrostatic discharge interference and an error detection result represented by at least one of the first error detection signal and the second error detection signal indicates an error, the electrostatic discharge protector disables the notification signal to be output.

Other novel features of the disclosure will become more apparent from the following detailed description when taken in conjunction with the accompanying drawings.

DETAILED DESCRIPTION OF EMBODIMENT

In order to make the purpose, technical solutions and advantages of the present disclosure more clear, the present disclosure will be described in further detail below in conjunction with the accompanying drawings and embodiments. It should be understood that the specific embodiments described here are only used to explain the embodiments of the present disclosure, and are not intended to limit the present disclosure.

Figure 1:
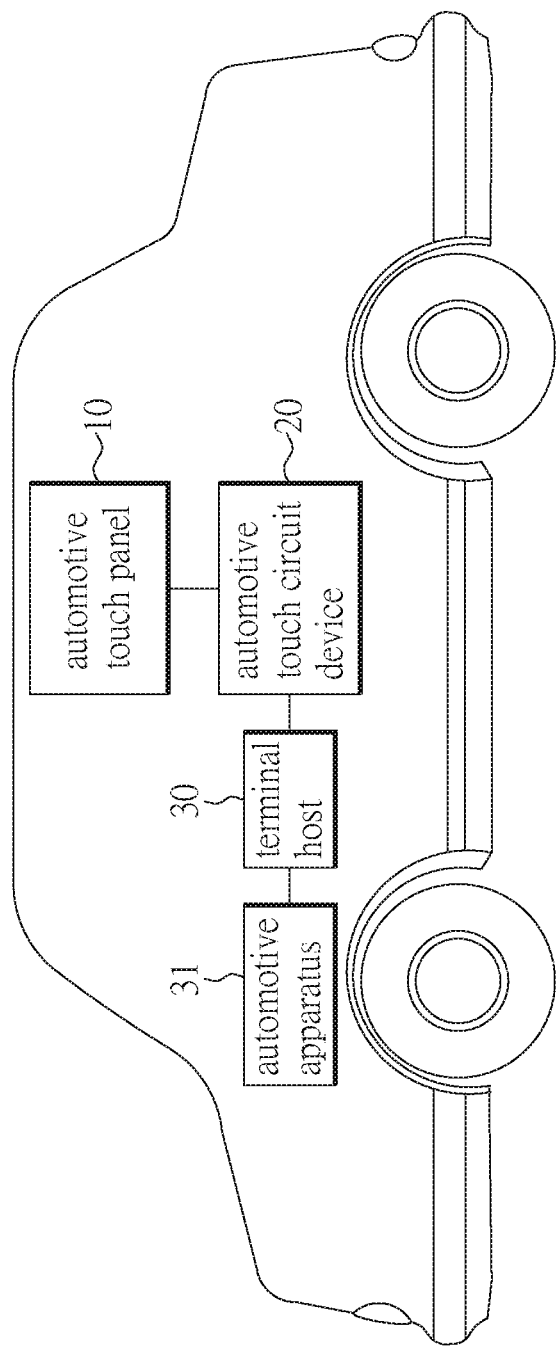
FIG. 1 is a schematic diagram showing an automobile central control system using the automotive touch circuit device with electrostatic discharge protection of the present disclosure.

FIG. 1 is a schematic diagram illustrating an automobile central control system using the automotive touch circuit device with electrostatic discharge (ESD) protection of the present disclosure. The automobile central control system includes an automotive touch panel 10, an automotive touch circuit device 20, and a terminal host 30. The automotive touch panel 10 allows the driver or passenger of the automobile to perform touch operations so as to control settings of the automobile, such as but not limited to gear setting, automobile light setting, handbrake setting, etc. The automotive touch circuit device 20 is coupled to the automotive touch panel 10 for correspondingly controlling the terminal host 30 according to the touch operation performed on the automotive touch panel 10. The terminal host 30 is electrically connected to at least one automotive apparatus 31, such as but not limited to a gear apparatus, an automobile light apparatus, a handbrake apparatus, etc., so as to control the at least one automotive apparatus 31 according to the touch operation performed on the automobile touch panel 10.

Figure 2:
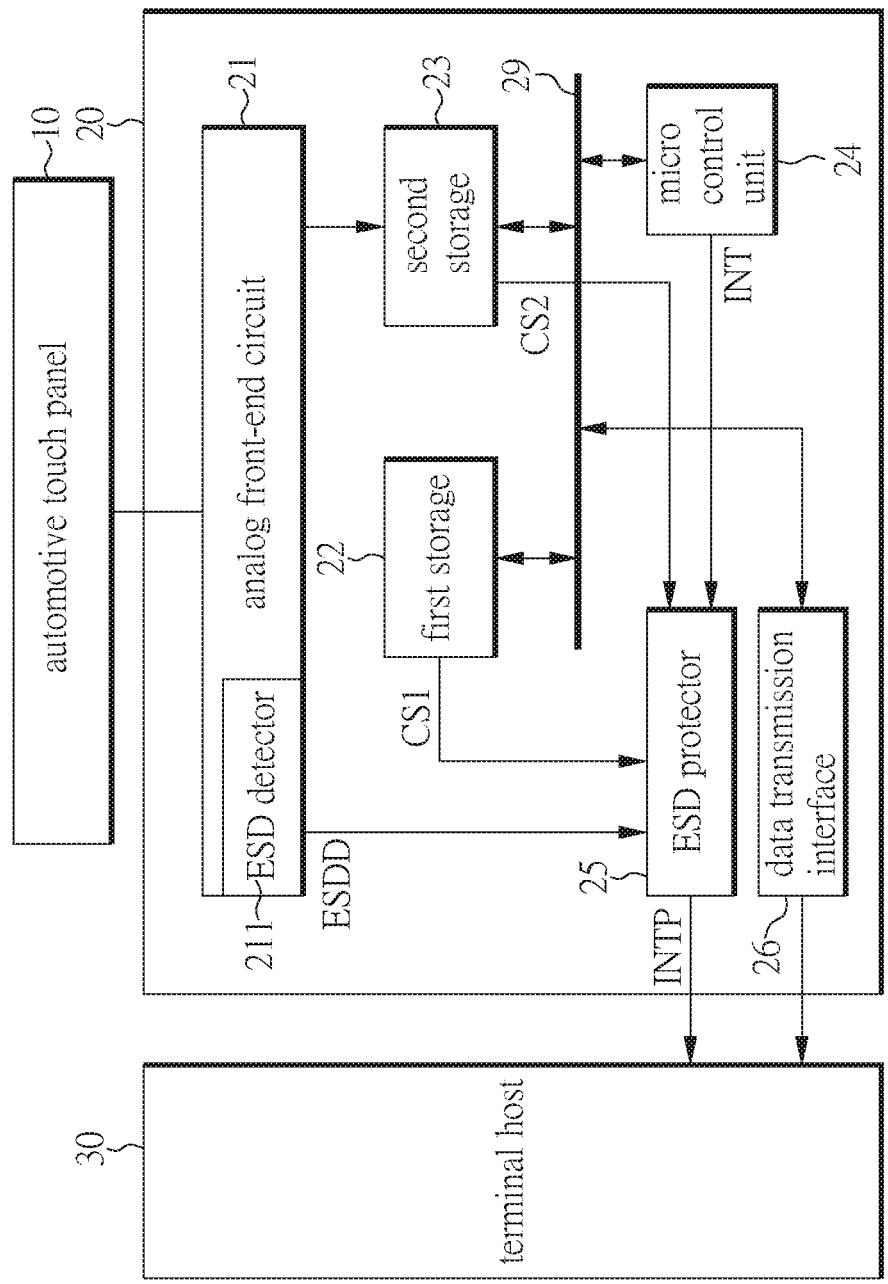
FIG. 2 is a schematic diagram of the automotive touch circuit device with electrostatic discharge protection according to the present disclosure.

FIG. 2 is a schematic diagram illustrating an automotive touch circuit device with electrostatic discharge protection according to the present disclosure. The automotive touch circuit device 20 includes an analog front-end circuit 21, a first storage 22, and a second storage 23, a micro control unit 24, an electrostatic discharge (ESD) protector 25 and a data transmission interface 26. The analog front-end circuit 21 is provided to receive touch input generated by the automotive touch panel 10 according to the touch operation performed by the driver or passenger, and to output touch data according to the touch input. The first storage 22 stores a control parameter for controlling the operation of the automotive touch circuit device 20. The second storage 23 is coupled to the analog front-end circuit 21 for receiving and storing touch data. The micro control unit 24 is coupled to the first storage 22 and the second storage 23 and, based on the touch scanning behavior mode of the automobile touch circuit device 20 represented by the control parameter, the micro control unit 24 reads the touch data from the second storage 23 and performs corresponding calculation processing so as to calculate the touch coordinate and write the touch coordinate back to the second storage 23, and then sends the notification signal INT to the terminal host 30. After receiving the notification signal, the terminal host 30 obtains the touch coordinate through the data transmission interface 26, thereby completing one touch data processing operation. The data transmission interface 26 may be a serial interface such as an SPI (Serial Peripheral Interface) bus or an I2C (Inter-Integrated Circuit) bus, but the present disclosure is not limited thereto.

In order to provide the function of electrostatic discharge protection, the aforementioned analog front-end circuit 21 is further provided with an electrostatic discharge (ESD) detector 211 for detecting the automotive touch circuit device 20 and outputting a detection result signal ESDD, wherein the detection result signal ESDD represents whether there is electrostatic discharge (ESD) interference occurred. In one embodiment, the electrostatic discharge detector 211 is an analog detection circuit for detecting the working voltage WV of the automotive touch circuit device 20. When the detected working voltage VW is higher than a preset upper threshold voltage TH1 or lower a predetermined lower threshold voltage TH2 (that is, WV>TH1 or WV<TH2), the output detection result signal ESDD indicates that there is electrostatic discharge interference occurred, wherein the upper threshold voltage TH1 is greater than the lower threshold voltage TH2, the detection result signal ESDD being 1 indicates that there is electrostatic discharge interference occurred, and the detection result signal ESDD being 0 indicates that there is no electrostatic discharge interference occurred.

Furthermore, in one embodiment, the first storage 22 is a register, and the control parameter stored in the register has a first error detection code, based on which a first error detection signal CS1 can be generated correspondingly. The first error detection signal CS1 represents whether the error detection result based on the first error detection code is an error. The second storage 23 is a static random access memory (SRAM), and the touch data stored in the static random access memory has a second error detection code, wherein, according to the second error detection code, a second error detection signal CS2 can be generated correspondingly. The second error detection signal CS2 represents whether the error detection result based on the second error detection code is an error.

The first error detection code or second error detection code may be any mechanism that can detect whether data is erroneous, such as checksum, parity check, etc. In one embodiment, the first error detection code and the second error detection code are both checksums. That is, in the automotive touch circuit device 20, the first error detection code is generated by dividing the control parameter into K pieces of data, then adding all the values of the pieces of data together to generate a number, and taking the 1's complement of the number to obtain the first error detection code. The first error detection signal CS1 is generated by adding all the values of all K pieces of data and then adding the first error detection code, and taking the 1's complement of the above addition result to obtain the first error detection signal CS1. If the first error detection signal CS1 is 0, it means that the error detection result indicates there being no error. If the first error detection signal CS1 is 1, it means that the error detection result indicates there being an error. Similarly, the second error detection code is generated by dividing the touch data into K pieces of data, then adding all the values of the pieces of data together to generate a number, and taking the 1's complement of the number to obtain the second error detection code. The second error detection signal CS2 is generated by adding all the values of all K pieces of data and then adding the second error detection code, and taking the 1's complement of the above addition result to obtain the second error detection signal CS2. If the second error detection signal CS2 is 0, it means that the error detection result indicates there being no error. If the second error detection signal CS2 is 1, it means that the error detection result indicates there being an error.

The micro control unit 24, the data transmission interface 26, the first storage 22 and second storage 23 are coupled together through a data bus 29. Therefore, the micro control unit 24 may access the first storage 22 and the second storage 23 through the data bus 29, and generate the notification signal INT according to the control parameter and touch data.

The electrostatic discharge protector 25 is coupled to the electrostatic discharge detector 211, the first storage 22, the second storage 23 and the micro control unit 24 to respectively receive the detection result signal ESDD, the first error detection signal CS1, the second error detection signal CS2 and the notification signal INT. When the detection result signal ESDD indicates that there is no electrostatic discharge interference occurred, the electrostatic discharge protector 25 enables the notification signal INT to be output to the terminal host 30 so as to notify the terminal host 30 to receive the data of the touch coordinate (in FIG. 2 the output notification signal is denoted by INTP). When the detection result signal ESDD indicates that there is electrostatic discharge interference occurred, and the error detection result represented by at least one of the first error detection signal CS1 and the second error detection signal CS2 indicates there being an error, the electrostatic discharge protector 25 disables the notification signal INT to be output to the terminal host 30.

The terminal host 30 is electrically connected to the at least one automotive apparatus 31. The data transmission interface 26 may access the touch coordinate generated by the micro control unit 24 according to the control parameter and touch data through the data bus 29, and transmit the touch coordinate to the terminal host 30. Therefore, the terminal host 30 may control the operation of the automotive apparatus 31 according to the touch coordinate.

Figures 3A, 3B:
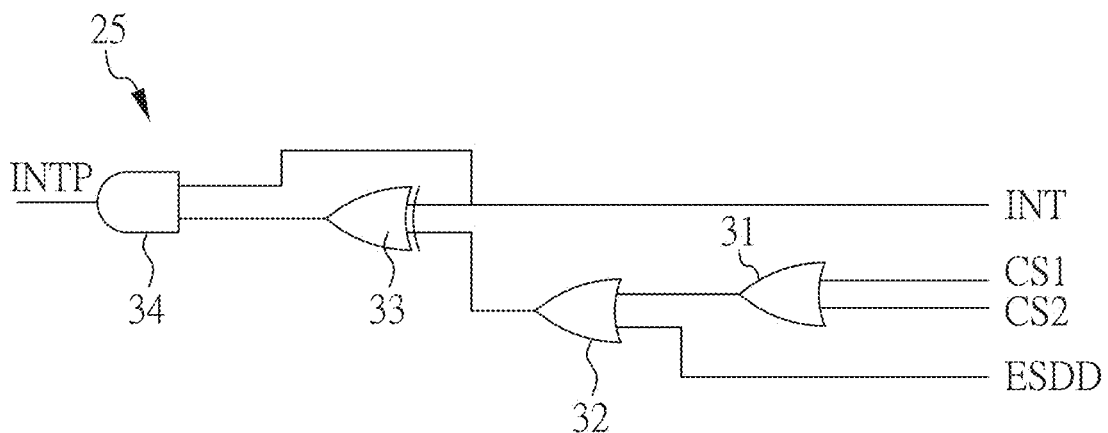
FIG. 3A shows a truth table corresponding to a combinational logic circuit for implementing an electrostatic discharge protector.
FIG. 3B shows a combinational logic circuit diagram of an electrostatic discharge protector according to an embodiment of the present disclosure.

Furthermore, since the electrostatic discharge protector 25 determines whether to enable or disable the output of the notification signal INT based on the values of the detection result signal ESDD, the first error detection signal CS1 and the second error detection signal CS2, it is possible to only use one combinational logic circuit to realize the logic relationship among the notification signal INTP output by the electrostatic discharge protector 25, and the detection result signal ESDD, the first error detection signal CS1, the second error detection signal CS2 and the notification signal INT input to the electrostatic discharge protector 25, as seen in the truth table shown in FIG. 3A that illustrates the logic relationship as follows:

when (INT, CS1, CS2, ESDD) is (0,0,0,0), INTP is 0,
when (INT, CS1, CS2, ESDD) is (0,0,0,1), INTP is 0,
when (INT, CS1, CS2, ESDD) is (0,0,1,0), INTP is 0,
when (INT, CS1, CS2, ESDD) is (0,0,1,1), INTP is 0,
when (INT, CS1, CS2, ESDD) is (0,1,0,0), INTP is 0,
when (INT, CS1, CS2, ESDD) is (0,1,0,1), INTP is 0,
when (INT, CS1, CS2, ESDD) is (0,1,1,0), INTP is 0,
when (INT, CS1, CS2, ESDD) is (0,1,1,1), INTP is 0,
when (INT, CS1, CS2, ESDD) is (1,0,0,0), INTP is 1,
when (INT, CS1, CS2, ESDD) is (1,0,0,1), INTP is 0,
when (INT, CS1, CS2, ESDD) is (1,0,1,0), INTP is 0,
when (INT, CS1, CS2, ESDD) is (1,0,1,1), INTP is 0,
when (INT, CS1, CS2, ESDD) is (1,1,0,0), INTP is 0,
when (INT, CS1, CS2, ESDD) is (1,1,0,1), INTP is 0,
when (INT, CS1, CS2, ESDD) is (1,1,1,0), INTP is 0,
when (INT, CS1, CS2, ESDD) is (1,1,1,1), INTP is 0, wherein INT represents the input notification signal, CS1 represents the first error detection signal, CS2 represents the second error detection signal, ESDD represents the detection result signal, INTP represents the output notification signal, INT being 1 means that the input notification signal is valid, INT being 0 means that the input notification signal is invalid, CS1 being 1 means that the error detection result of the first error detection code indicates an error, CS1 being 0 means that the error detection result of the first error detection code indicates no error, CS2 being 1 means that the error detection result of the second error detection code indicates an error, CS2 being 0 means that the error detection result of the second error detection code indicates no error, ESDD being 1 means that there is electrostatic discharge interference occurred, ESDD being 0 means that there is no electrostatic discharge interference occurred, INTP being 1 means that the output notification signal is valid, and INTP being 0 means that the output notification signal is invalid.

FIG. 3B shows a combinational logic circuit diagram of an electrostatic discharge protector according to an embodiment of the present disclosure. The electrostatic discharge protector can be implemented using logic gates. The electrostatic discharge protector 25 includes a first logic OR gate 31, a second logic OR gate 32, a logic XOR (exclusive OR) gate 33, and a logic AND gate 34. The first logic OR gate 31 has an output end, and two input ends respectively connected to the first error detection signal CS1 and the second error detection signal CS2. The second logic OR gate 32 has an output end, and two input ends respectively connected to the detection result signal ESDD and the output end of the first logic OR gate 31. The logic XOR gate 33 has an output end, and two input ends respectively connected to the input notification signal INT and the output end of the second logic OR gate 32. The logic AND gate 34 has two input ends respectively connected to the input notification signal INT and the output end of the logic XOR gate 33, and an output end for generating the output notification signal INTP. With such a combinational logic circuit of the electrostatic discharge protector 25, it is able to only use logic gates to implement the logic relationship that satisfies the truth table of FIG. 3A shown in FIG. 3A so as to achieve low-cost and high-reliability electrostatic discharge protection for automotive touch panels.

The aforementioned specific embodiments should be construed as merely illustrative, and not limiting the rest of the present disclosure in any way.

The invention claimed is:

1. An automotive touch circuit device, including:
an analog front-end circuit for receiving touch input generated by an automotive touch panel and outputting touch data according to the touch input, wherein the analog front-end circuit has an electrostatic discharge detector for detecting the automotive touch circuit device and outputting a detection result signal that represents whether there is electrostatic discharge interference;
a first storage for storing a control parameter to control the automotive touch circuit device to operate, the control parameter having a first error detection code, wherein a first error detection signal is generated correspondingly according to the first error detection code, and the first error detection signal represents whether an error detection result based on the first error detection code indicates an error;
a second storage coupled to the analog front-end circuit and configured to receive and store the touch data having a second error detection code, wherein a second error detection signal is generated correspondingly according to the second error detection code, and the second error detection signal represents whether an error detection result based on the second error detection code indicates an error;
a micro control unit coupled to the first storage and the second storage for generating a notification signal based on the control parameter and the touch data; and
an electrostatic discharge protector coupled to the electrostatic discharge detector, the first storage, the second storage and the micro control unit for respectively receiving the detection result signal, the first error detection signal, the second error detection signal and the notification signal,
wherein, when the detection result signal indicates that there is no electrostatic discharge interference, the electrostatic discharge protector enables the notification signal to be output and, when the detection result signal indicates that there is electrostatic discharge interference and an error detection result represented by at least one of the first error detection signal and the second error detection signal indicates an error, the electrostatic discharge protector disables the notification signal to be output.

2. The automotive touch circuit device as claimed in claim 1, wherein the first error detection code is a checksum, and the second debugging code is a checksum.

3. The vehicle touch circuit device as claimed in claim 1, wherein the electrostatic discharge detector is an analog detection circuit for detecting working voltage of the automotive touch circuit device and, when the detected working voltage is higher than a predetermined upper threshold voltage or lower than a predetermined lower threshold voltage, the output detection result signal indicates that there is electrostatic discharge interference.

4. The automotive touch circuit device as claimed in claim 1, wherein the notification signal is output to a terminal host, and the terminal host is electrically connected to and controls at least one automotive apparatus.

5. The automotive touch circuit device as claimed in claim 4, further comprising a data transmission interface, wherein the micro control unit generates a touch coordinate based on the control parameter and the touch data, and the transmission interface transmits the touch coordinate to the terminal host.

6. The automotive touch circuit device as claimed in claim 5, wherein the micro control unit, the data transmission interface, the first storage and the second storage are coupled together through a data bus.

7. The automotive touch circuit device as claimed in claim 1, wherein the first storage is a register, and the control parameter stored in the register represent a touch control scanning behavior mode of the automotive touch circuit device.

8. The automotive touch circuit device as claimed in claim 1, wherein the second storage is a static random access memory.

9. The automotive touch circuit device as claimed in claim 1, wherein the electrostatic discharge protector is a combinational logic circuit for realizing a logic relationship among the notification signal output by the electrostatic discharge protector, and the detection result signal, the first error detection signal, the second error detection signal and the notification signal input to the electrostatic discharge protector.

10. The automotive touch circuit device as claimed in claim 9, wherein the logic relationship is: when (INT, CS1, CS2, ESDD) comprises (0,0,0,0), (0,0,0,1), (0,0,1,0), (0,0,1,1), (0,1,0,0), (0,1,0,1), (0,1,1,0), (0,1,1,1), (1,0,0,0), (1,0,0,1), (1,0,1,0), (1,0,1,1), (1,1,0,0), (1,1,0,1), (1,1,1,0) and (1,1,1,1), INTP comprises 0, 0, 0, 0, 0, 0, 0, 0, 1, 0, 0, 0, 0, 0 and 0, respectively, where INT represents the input notification signal, CS1 represents the first error detection signal, CS2 represents the second error detection signal, ESDD represents the detection result signal, INTP represents the output notification signal, INT being 1 indicates that the input notification signal is valid, INT being 0 indicates that the input notification signal is invalid, CS1 being 1 means that the error detection result of the first error detection code indicates an error, CS1 being 0 means that the error detection result of the first error detection result code indicates no error, CS2 being 1 means that the error detection result of the second error detection code indicates an error, CS2 being 0 means that the error detection result of the second error detection code indicates no error, ESDD being 1 means that there is electrostatic discharge interference, ESDD being 0 means that there is no electrostatic discharge interference, INTP being 1 means that the output notification signal is valid, and INTP being 0 means that the output notification signal is invalid.

11. The automotive touch circuit device as claimed in claim 9, wherein the electrostatic discharge protector includes:
- a first logic OR gate having an output end, and two input ends respectively connected to the first error detection signal and the second error detection signal;
- a second logic OR gate having an output end, and two input ends respectively connected to the detection result signal and the output end of the first logic OR gate;
- a logic exclusive OR gate having an output end, and two input ends respectively connected to the input notification signal and the output end of the second logic OR gate; and
- a logic AND gate having two input ends respectively connected to the input notification signal and the output end of the logic exclusive OR gate, and an output end for generating the output notification signal.

* * * * *